Patented Mar. 11, 1930

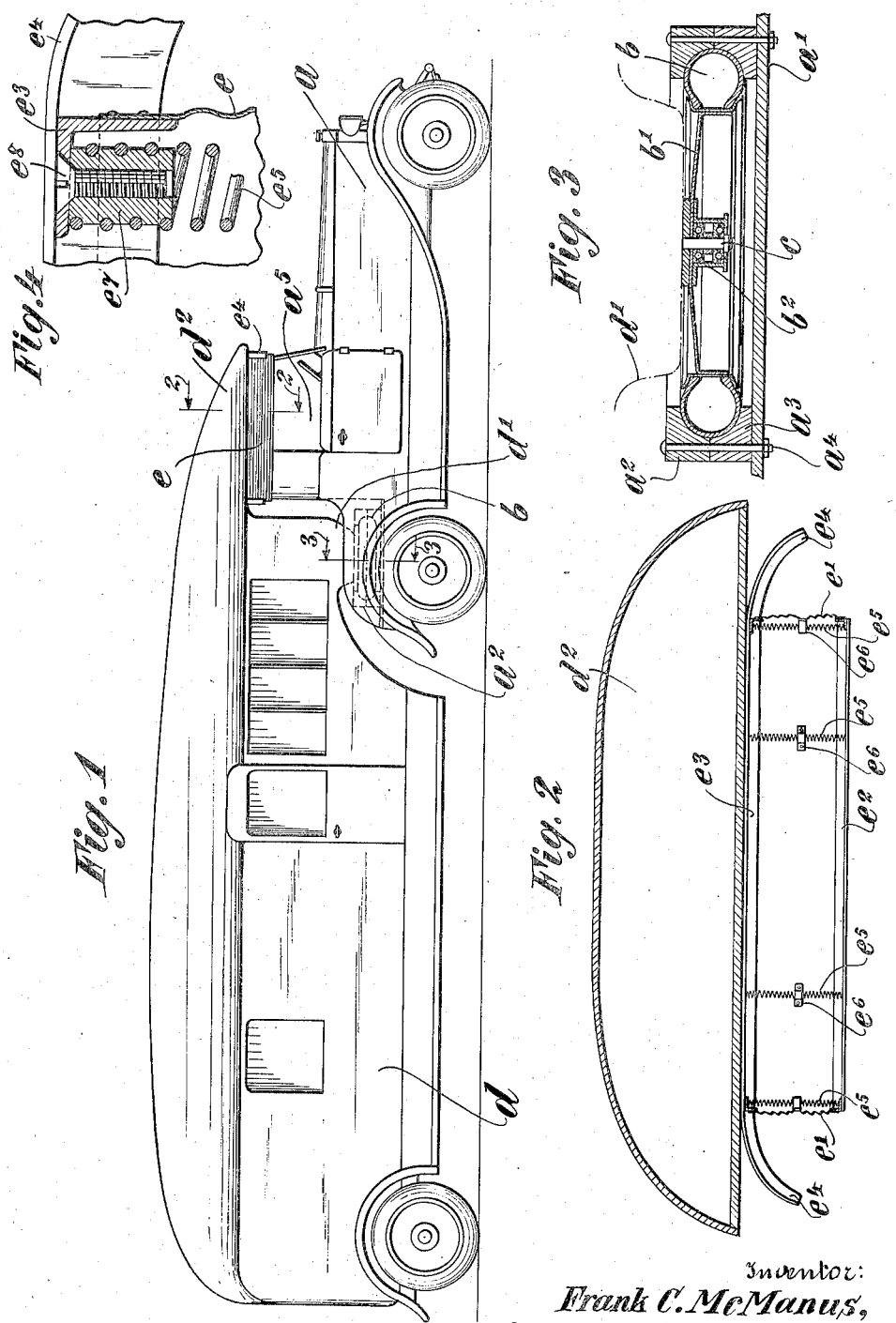

1,750,186

UNITED STATES PATENT OFFICE

FRANK C. McMANUS, OF BROOKLYN, NEW YORK, ASSIGNOR TO INTERNATIONAL MOTOR COMPANY, OF NEW YORK, N. Y., A CORPORATION OF DELAWARE

FLEXIBLE CLOSURE FOR TRACTOR-TRAILER VEHICLES

Application filed January 12, 1929. Serial No. 331,965.

The present invention relates to flexible closures for the driver's cab of a vehicle, the top of which moves with respect to the seat and body, and embodies, more specifically, an improved closure of an accordion type which accommodates itself to irregularities in the positioning of the body and relatively movable top in certain types of vehicles.

The invention has particular utility in connection with tractor-trailer vehicles of the type in which the trailer serves as the passenger or load carrying portion of the vehicle and is formed with an overhang beyond its fifth wheel which serves as the top for the cab on the tractor. It will readily be seen that in turning sharp corners, or in backing and going over extreme irregularities in the road surface, the overhanging top portion will project in a direction such that the cab of the tractor will not be fully covered. Under these conditions, it is desirable that a sufficient space be provided between the top of the cab and the overhanging top portion of the trailer to prevent interference between the two. This is particularly necessary when the tractor mounts a sharp incline, at which time the clearance between the top of the tractor cab and the overhanging portion of the trailer is reduced considerably.

An object of this invention is to provide a flexible closure between the top of the cab of the tractor and the suitably spaced overhanging top of the trailer which latter serves as the closure for the cab. It is further contemplated that this flexible closure shall adapt itself readily to misalignment of the tractor and trailer and accommodate relative movement between the two in all directions.

Further objects and advantages will be apparent as the invention is described more fully in connection with the accompanying drawings, wherein:

Figure 1 is a view in side elevation showing a preferred form of tractor and trailer provided with a flexible closure constructed in accordance with the present invention.

Figure 2 is a view in section, taken on line 2—2 of Figure 1, and looking in the direction of the arrows.

Figure 3 is a view in section, taken on line 3—3 of Figure 1, and looking in the direction of the arrows.

Figure 4 is an enlarged segmental view in section, showing the manner in which the flexible closure is held against the top.

Referring to the above drawings, $a$ designates a tractor which may be of any desired form having a fifth wheel mounting at the rear thereof. This fifth wheel mounting is carried on a platform $a'$ and constitutes cooperating clamping members $a^2$ and $a^3$ which may be secured together by means of bolts $a^4$. A convenient form of fifth wheel has been found to be a vehicle tire and is indicated at $b$, having a wheel portion $b'$. Bearing $c$ is carried by a pedestal $d'$ on a trailer $d$ and cooperates with the bearing $b^2$ formed on the fifth wheel.

The top of the trailer is formed with an overhang $d^2$ which extends above and over the cab portion $a^5$ of the tractor $a$. In practice, it has been found that the clearance between the top of the cab and the overhanging portion $d^2$ of the trailer should be eight inches but this may be varied as conditions in service dictate. In order that the overhanging portion $d^2$ may serve as a top for the cab $a^5$ and in order that the space between these portions may be closed, an accordion-like flexible closure $e$ is provided in the form of a rectangular member having flexible side walls $e'$. These flexible sides are mounted upon a rectangular angle frame $e^2$ which is secured to the top of the cab $a^5$. The top of the flexible closure is formed of a similar rectangular frame $e^3$, the front and rear transverse frame members being extended and curved downwardly as at $e^4$ for the purpose described hereinafter. In order that the top and bottom frame members $e^2$ and $e^3$ may normally be urged apart to accommodate the varying spacing between the tractor and trailer elements, springs $e^5$ are mounted between the frame members. These springs are carried in blocks $e^6$ in the side members and are threaded over the blocks $e^7$ which are suitably secured to the top frame members $e^3$ as by means of screws $e^8$. It will be seen that the springs normally urge the top frame member $e^3$ upwardly and hold it against the lower portion of the overhanging top $d^2$. The transverse front and rear portions of the frame which are provided with the downwardly extending portions $e^4$ serve as shoes to rub against the top $d^2$ and the portions $e^4$ serve as guides to enable the closure to ride under the overhang when the tractor has been turned to a great angle with respect to the trailer.

While the invention has been described with specific reference to the structure shown in the accompanying drawings, it is not to be limited, save as defined in the appended claims.

I claim as my invention:

1. In a tractor-trailer vehicle construction, a driver's cab on the tractor, an overhanging top portion on the trailer, a flexible closure between the cab and the overhanging top, top and bottom frames carrying the closure, means to mount the bottom frame upon the cab, springs between the top and bottom frames to urge the top frame against the overhanging top, and downwardly extending extensions on the top frame to cooperate with the overhanging top in positioning the closure.

2. In a tractor-trailer vehicle construction, a driver's cab on the tractor, an overhanging top portion on the trailer, a flexible closure between the cab and the overhanging top, top and bottom frames carrying the closure, means to mount the frames upon the overhanging top and cab with provision for relative movement between one of the frames and one of the said mounting elements, and guide shoes on the relatively movable frame to facilitate the movement of the frame into juxtaposition with the said mounting element.

3. In a tractor-trailer vehicle construction, a driver's cab on the tractor, an overhanging top portion on the trailer, a flexible closure between the cab and the overhanging top, top and bottom frames carrying the closure, means to mount the bottom frame on the cab, and means to urge the top frame yieldingly against the overhanging top with provision for movement relative thereto.

This specification signed this 10th day of January, A. D. 1929.

FRANK C. McMANUS.